Figure 1:
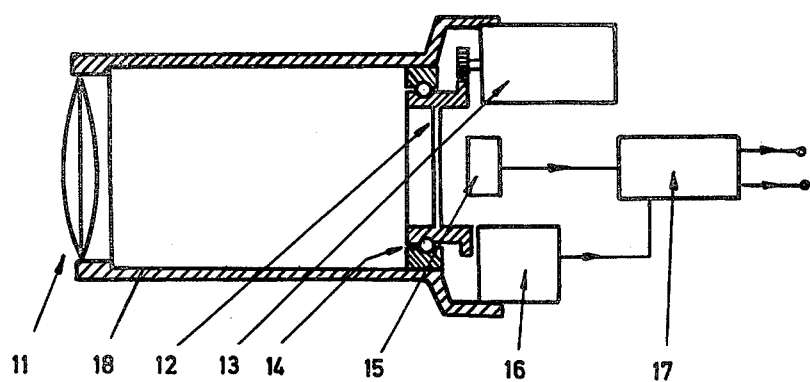

United States Patent [19]

Skagerlund

[11] 4,178,505
[45] Dec. 11, 1979

[54] DEVICE FOR DETERMINING THE DIRECTION TOWARDS A REMOTE OBJECT

[75] Inventor: Lars-Erik Skagerlund, Karlskoga, Sweden

[73] Assignee: Aktiebolaget Bofors, Bofors, Sweden

[21] Appl. No.: 860,519

[22] Filed: Dec. 14, 1977

[51] Int. Cl.² .............................................. G01J 1/20
[52] U.S. Cl. .................................. 250/203 R; 356/152
[58] Field of Search ................ 250/203, 233; 356/141, 356/152

[56] References Cited

U.S. PATENT DOCUMENTS

| | | | |
|---|---|---|---|
| 2,931,912 | 4/1960 | MacLeish | 250/203 R |
| 2,972,812 | 2/1961 | Jackson, Jr. | 250/203 R |
| 2,997,699 | 8/1961 | Lovell | 250/203 R |
| 3,000,255 | 9/1961 | Iddings | 356/141 |
| 3,134,022 | 5/1964 | Jones et al. | 250/203 R |
| 3,263,084 | 7/1966 | Boydell | 250/203 R |
| 3,541,335 | 11/1970 | Harrington et al. | 250/203 R |

Primary Examiner—David C. Nelms
Attorney, Agent, or Firm—Pollock, Vande Sande & Priddy

[57] ABSTRACT

An apparatus for measuring the coordinates of a target object with respect to a reference point within a particular field of view. A mask having a radiation transparent portion bounded by a straight line and a substantially logarithmic curve meeting at the reference point rotates about the reference point at a reference frequency to modulate a beam of radiant energy from the target object. The modulated beam is applied to a detector that generates corresponding electrical pulses having a duration that corresponds to the radial distance of the target object from the reference point. The phase shift of the pulses with respect to the reference frequency determines the angular position of the target.

12 Claims, 5 Drawing Figures

DEVICE FOR DETERMINING THE DIRECTION TOWARDS A REMOTE OBJECT

The present invention relates to a device for determining the coordinates representing the direction towards a remote object, for instance an object to be guided or a target to be tracked, including a mobable system of sensitivity beams or radiation beams.

The invention is particularly intended to be used in such cases where the object to be determined emits radiation generated by a radiation source disposed on the object, or infra red radiation generated by the object or the target itself. The radiation may also be derived from a reflector disposed on the object, which reflector is subject to radiation emitted by a radiation source positioned at the location of the measuring device. A significant feature of the measuring situation is the fact that the distance between the measuring device and the object varies. Therefore the measuring device must have a wide field of view when the target appears at a narrow distance, while the requirements of sensitivity are moderate. When the target appears at a large distance, on the other hand, a greater sensitivity is required within a narrow field of view. It is previously known to provide a measuring device having narrow clearly-defined, fan-shaped sensitivity beams sweeping alternatingly in elevation and azimuth over the field of view of the measuring device, whereby the times when the sensitivity beams pass over the object constitute a measure of the position of the object. In order to cover the required wide field of view when the object is located at a narrow distance from the measuring device and in spite of this limit the measuring time, it is necessary to use a comparatively high sweeping velocity. The resulting fast passage over the object requires a rapid reaction of the detector of the measuring device, which is often difficult to attain. A further limit appears if the radiation source is modulated with a comparatively low frequency, which is often the case when the radiation source consists of a pulsating laser source. In order to avoid these difficulties it is common to prolong the time of passage over the object by increasing the width of the fan-shaped sensitivity beams, which, however, results in a corresponding decrease of the accuracy of the measurement. In order to attain, in spite of that fact, a sufficient accuracy of the measurement when the object is located at a great distance from the measuring device, it is possible to provide the measuring device with zoom optics by means of which the accuracy of the measurement may be increased and the field of view diminished relative to the distance to the object. Another alternative is to use two measuring devices, one having a wide field of view and a low accuracy of the measurement and the other having a narrow field of view and a great accuracy of the measurement. A third alternative is to use changeable, fixed optical systems having different magnifications.

In order to attain a good accuracy of the measurement for small signals, a large opening diameter of the optical system is desired, which makes the zoom optics very expensive as well as bulky. The same thing applies to the changeable optical systems, in addition to which a serious functional cut-off appears in conjunction with the exchange of the optical systems. The devices for generating the sweeping fan-shaped sensitivity beams are as a rule very complicated and delicate because of high manufacturing precision, which makes this part of the measuring device expensive. As a result also the alternative including two separate measuring devices is expensive and complicated.

The main object of the present invention is therefore to provide an improved measuring device of the above-mentioned type, which device is much more simple and which combines the requirement of a wide field of view with the requirement of a great accuracy of measurement within a limited region of the field of view. For this object the invention provides a sensitivity beam system including one or more clearly defined sensitivity beams having a fixed relative position and arranged to be rotated about a fixed point located on or near the boundary line of the sensitivity beam and one of or some of the beams of the beam system, respectively.

The invention will in the following be described in more detail with reference to the accompanying drawings which illustrate, by way of example, some embodiments of the invention.

In the drawings

Figure 2:
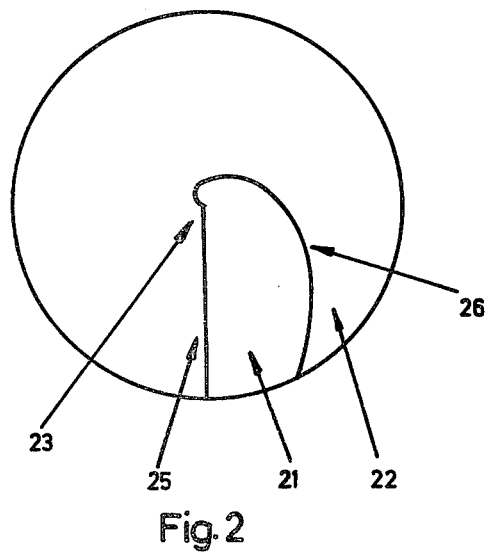
Figure 3:
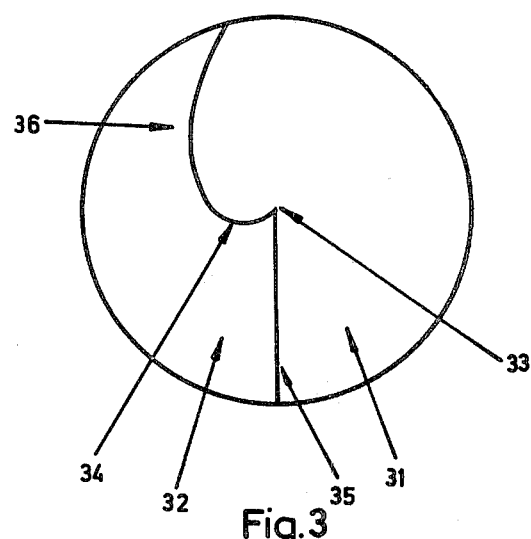
Figure 4:
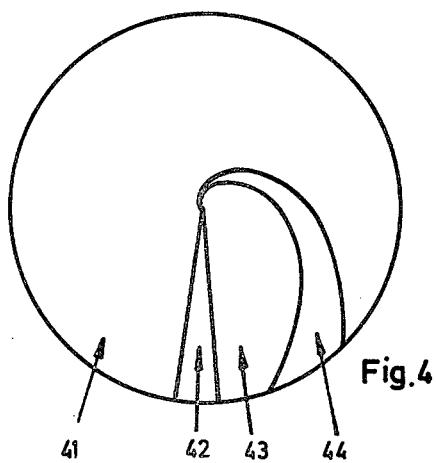
Figure 5:
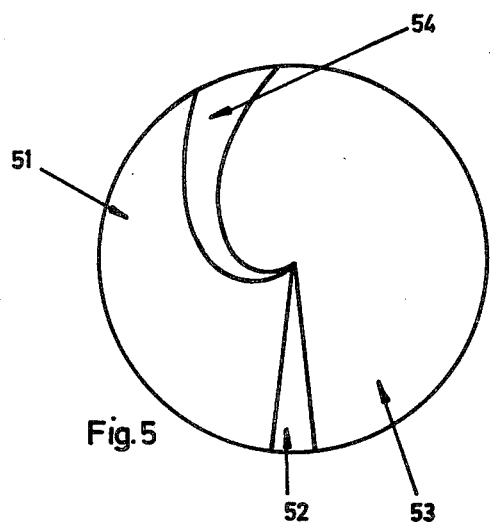

FIG. 1 schematically illustrates one embodiment of a measuring device according to the invention, FIG. 2 schematically illustrates one embodiment of the measuring device having means for determining the form of the sensitivity beam and indirectly also the form of a section of the sensitivity beam, FIG. 3 is an enlarged view of the central portion of FIG. 2, FIG. 4 illustrates another embodiment of the measuring device having means for determining the form of the sensitivity beam and FIG. 5 is an enlarged view of the central portion of the region illustrated in FIG. 4.

In FIG. 1, which schematically illustrates a side view of the measuring device according to the invention, the reference numeral 11 indicates an objective lens which picks up the radiation emitted by the object and projects an image on a mask located in the image plane of the objective lens. The mask is concentrically mounted on a bearing 14 and arranged to be rotated by means of an electric motor 13. In operative association with the rotating mask there is provided sensor means 16 of a type known in the art, and therefore not described in detail. An electrical signal is generated by the sensor means which signal is an unambigous function of the instantaneous angular position of the mask. In connection with the mask a photodetector 15 is provided adjacent the mask and the output signal provided by the detector is applied to a signal processing circuit 17, of a type known in the art. Also the out-put signal from the sensor means 16 is applied to the signal processing circuit 17 for evaluation.

The objective lens 11 and the mask 12 are disposed inside a cylindrical housing 18 arranged to be aimed towards the object whose direction coordinates are intended to be determined. The measuring device is preferably disposed inside a larger sight unit housing provided with means for facilitating the sighting towards the object.

FIG. 2 illustrates one embodiment of the rotating mask 12. As seen in the figure, the mask consists of two parts, one part 21, for instance an opening, through which radiation can pass to the photo detector 15, and a second part 22 which is opaque to radiation emitted by the radiation source. When the mask is rotating the transparent part 21, generates a sensitivity beam, which is rotating about the rotation center 23 of the mask, which center in this case coincides with the center of the field of view. The form of the sensitivity beam is determined by the form of the opening 21 and from the figure it will be apparent that the boundary line adjoining the opaque portion of the mask mainly consists of a logarithmic spiral 26 as well as a straight line 25, joined at the rotation center 23 of the mask.

In FIG. 3, which is an enlarged view of the region around the rotation center 23 of the mask, the transition between the logarithmic spiral 26 and the straight line 25 is more clearly illustrated. Close to the center the logarithmic spiral is transferred to a linear spiral 34, which joins the straight line in the rotation center 23, or so that the rotation center is located just beside the joining point.

The reason why the transparent part 21 has been given this form will be more clearly explained below.

The radiation emitted by the object is projected by the lens 11 to a point on the mask 12, whereby the point by way of introduction is presumed not to coincide with the rotation center. The point will describe a circle on the surface of the rotating mask with its center located at the rotation center 23, of the mask. During that part of the revolution when the point is passing the transparent part 21, of the mask an output pulse signal is generated by the detector, if the radiation emitted by the radiation source is continuous, or a pulse train if the radiation source is pulse modulated. The pulse or pulse train is repeated each revolution when the mask is rotating and on account of the form of the transparent part, the length of the pulse and the pulse train, respectively, is directly related to the distance between the point and the rotation center. The phase of the pulse or the pulse train relative to the rotation of the mask is a measure of direction from the rotation center towards the projected point. In this way an indication of the position of the point in polar coorinates is received as well as a corresponding indication of the direction towards the object.

The length of the pulse or the pulse train and the phase, respectively, is determined by means of the signal processing circuit 17, whereby a reference signal, required for the phase comparison, is derived from the sensor means 16. The signal processing circuit 17 may preferably include a micro computer which besides the signal processing performs, by means of a known computational program, for the position of the object a conversion between polar coordinates and cartesian coordinates, if desired.

By the form of the boundary line adjoining the transparent part of the mask illustrated by the FIGS. 2 and 3, i.e. a boundary line which consists of a straight line 25, as well as a logarithmic spiral 26, a pulse or pulse train is provided, the length of which is proportional to the logarithm of the inverted value of the distance between the point and the rotation center of the mask. From this it follows that the uncertainty of the measurement in the radial direction decreases linearly with the distance between the point and the center. As the direction towards the point is derived from the time of passage of the straight line 25, also the uncertainty of measurement in the tangential direction decreases with the distance from the center. In this way it is possible to combine a good accuracy of measurement in the central portion of the field of view with a wide field of view. Said relationship between the uncertainty of measurement and the distance to the center is true when the limited rapidity of the photodetector or the pulse frequency of the radiation source limits the resolution. Said relationship is not true very close to the center where said conditions provide such a good resolution that other conditions, such as limited image sharpness, provides a limitation. Therefore it is appropriate to design the boundary line of the mask as a linear spiral 34 close to the center, whereby it is prevented that the dynamic range of the measuring device is occupied to reach a higher resolution than can be utilized.

In the following some examples of other embodiments within the scope of the invention will be described. It is thus possible, by means of different designs of the transparent part of the mask, to adjust the properties of the accuracy of the measurement according to different applications. One example of another type of embodiment is shown in FIG. 4, in which the entire mask is illustrated and in FIG. 5, which is an enlarged view of the central portion of the mask. In both of these figures the opaque portion of the mask has been indicated by the numerals 41, 43 and 51, 53 respectively, while the transparent parts have been indicated by 42, 44 and 52, 54, respectively. With such a form of the transparent part two pulses having a constant length are obtained from the photo detector 15 each revolution of the mask, but in which the interval between the pulses provides an unambigous measurement of the distance between the projected point and the rotation center of the mask. The constant length of the pulses provides a possibility for the signal processing circuit 17 to suppress any noise pulses that may occur. From this it follows that said embodiment is specifically usable for such applications in which disturbances may occur. In order to avoid confusion between the both pulse trains it is appropriate to design the regions 42 and 44, respectively, with different widths.

Another embodiment within the scope of the invention is the one in which the rotating mask is replaced by a rotating photo detector having a sensible area designed in analogy with the transparent portion of the mask previously described and in which the electrical output signal is derived from the photodetector via for instance slip rings. A further embodiment is the one in which a radiation source is disposed in the measuring device instead of a photodetector and a photodetector disposed on the object instead of the radiation source.

This embodiment is of interest when it is desired to receive the information regarding the position of the object at the object instead of at the measuring device. Information regarding the angular position of the rotating part of the measuring device is in this case transmitted telemetrically to the object by modulating the radiation source in a manner known in the art.

It is appreciated that a plurality of modifications to the preferred embodiments of the invention described above are possible within the scope of the invention.

I claim:

1. An apparatus for measuring the coordinates of a target source of radiation with respect to a reference point within a particular field of view, comprising:
    means for generating one or more clearly defined sensitivity beams, the sensitivity beams shaped to define a source locating area positioned at said reference point and bounded by a straight line on one side and a substantially logarithmic curve on the other side, said straight line and said logarithmic curve meeting at said reference point;
    means for rotating said sensitivity beams about said reference point at a reference frequency to scan said source locating area over said field of view;

means for focusing an image of said target source of radiation in a plane including said source locating area;

detector means for generating at least one electrical signal in response to the radiant energy passed by said sensitivity beams when said source locating area scans across the image of said target source of radiation, said at least one electrical signal defining a time duration corresponding to the radial distance of said target source from said reference point and said at least one electrical signal being shifted in phase with respect to said reference frequency by an amount corresponding to the angular position of said target.

2. The apparatus of claim 1 wherein said means for generating the sensitivity beams includes a mask means having a radiation opaque portion and a radiation transparent portion, the transparent portion shaped to define the sensitivity beams.

3. The apparatus of claim 2 wherein the source locating area of said mask means is made of radiation transparent material.

4. The apparatus of claim 3 wherein said detector means includes means for generating an electrical pulse having a duration corresponding to the time required for the transparent locating area of said mask means to sweep across the image of said point source of radiation.

5. The apparatus of claim 2 wherein the source locating area of said mask means includes:
a first strip of radiation transparent material defining said straight line,
a second strip of radiation material defining said substantially logarithmic curve, and
a radiation opaque portion disposed between said first strip and said second strip.

6. The apparatus of claim 5 wherein said detector includes means for generating a first electrical pulse corresponding to the radiation passed by said first strip for each rotation of the mask means and a second pulse corresponding to the radiation passed by said second strip for each rotation of the mask means, the time interval between said first and said second pulses corresponding to the radial distance of said target source image from said reference point.

7. The apparatus of claim 6 wherein the width of said first and second strips differ and the corresponding pulse widths of said first and second pulses differ to distinguish said first pulse from said second pulse.

8. The apparatus of claim 1 wherein said substantially logarithmic boundary curve of said source locating area includes a linear spiral adjacent said reference point and terminating at said reference point.

9. An apparatus for measuring the coordinates of a target object with respect to a reference point within a particular field of view comprising:
means for generating a system of one or more clearly defined beams of radiant energy for defining the position of said target object, said beams of radiant energy shaped to define a target locating area positioned at said reference point and bounded by a straight line on one side and a substantially logarithmic curve on the other side;
means for rotating said beams of radiant energy about said reference point at a reference frequency; and
detector means for receiving the radiant energy and generating at least one corresponding electrical signal defining a time duration corresponding to the radial distance of said target from said reference point, said at least one electrical signal being shifted in phase with respect to said reference frequency by an amount corresponding to the angular position of said target.

10. The apparatus of claim 9 wherein said means for generating the beams of radiant energy includes a mask means having a radiation opaque portion and a radiation transparent portion shaped to define the sensitivity beams.

11. The apparatus of claim 10 wherein said means for generating radiation further includes means for transmitting radiant energy outwardly through said transparent portion of said mask means to scan the radiant energy over said field of view.

12. The apparatus of claim 9 wherein said detector means is positioned at said target object to receive the radiation transmitted by said radiation generation means and to generate said at least one corresponding electrical signal.

* * * * *